United States Patent [19]

Lolas

[11] 4,141,999

[45] Feb. 27, 1979

[54] BACON-LIKE MEAT ANALOG

[75] Inventor: George M. Lolas, Hoffman Estates, Ill.

[73] Assignee: Miles Laboratories, Inc., Elkhart, Ind.

[21] Appl. No.: 840,123

[22] Filed: Oct. 7, 1977

[51] Int. Cl.² .............................................. A23J 3/00
[52] U.S. Cl. .................... 426/104; 426/656; 426/802
[58] Field of Search ............. 426/104, 656, 802, 312, 426/601, 602, 613

[56] References Cited

U.S. PATENT DOCUMENTS

| | | | |
|---|---|---|---|
| 3,320,070 | 5/1967 | Hartman | 426/104 |
| 3,442,662 | 5/1969 | Robinson | 426/104 |
| 3,658,550 | 4/1972 | Hawley | 426/574 |
| 3,840,677 | 10/1974 | Leidy et al. | 426/802 X |
| 3,930,033 | 12/1975 | Corliss et al. | 426/104 X |
| 3,999,474 | 12/1976 | Sienkiewicz et al. | 426/104 X |

*Primary Examiner*—Raymond N. Jones
*Assistant Examiner*—Esther M. Kepplinger
*Attorney, Agent, or Firm*—Richard W. Winchell

[57] ABSTRACT

An improved bacon-like meat analog is provided having a novel simulated fatty portion which is intended when fried to ripple or crinkle and have a juicy, fatty mouthfeel similar to the fatty portions of bacon. The analog has alternate layers simulating the lean and fat portions of bacon. The improvement comprises including layers simulating the fat portions produced by cooking a composition mixture consisting essentially of 3 to 7 percent albumen, 25 to 40 percent water, 0 to 6 percent vegetable protein, 52 to 65 percent vegetable oil, 0.05 to 0.60 percent vegetable gums and 4 to 10 percent flavors and seasonings.

6 Claims, No Drawings

BACON-LIKE MEAT ANALOG

BACKGROUND AND PRIOR ART

Bacon-like meat analogs have been described in U.S. Pat. Nos. 3,320,070; 3,442,662; 3,537,859; 3,589,914; 3,658,550; 3,840,677 and 3,930,033 and in Canadian Pat. No. 872,186. These references describe various mixtures of vegetable proteins, binders, colors and flavors which have been employed to simulate the lean meat and fat portions of natural bacon. Although these prior art compositions may in a generic sense simulate bacon, they all have the disadvantages of not having the same juicy, fatty mouthfeel and cooked appearance of natural bacon. As a result these products have not been widely accepted by the consumer as a true substitute for real bacon.

SUMMARY OF THE INVENTION

In accordance with the present invention, an improved bacon-like meat analog is provided having a novel simulated fatty portion which is intended when fried to ripple or crinkle and have a juicy, fatty mouthfeel similar to the fatty portions of bacon. The bacon-like meat analog of this invention has alternate expanded layers simulating the lean and fat portions of bacon. The expanded layers simulating the lean portions are well known and are produced by cooking a composition mixture containing 10 to 40 percent vegetable protein fiber, 5 to 20 percent albumen, 5 to 20 percent starch, 30 to 60 percent water, 3 to 40 percent vegetable oil, 0.1 to 1.5 percent vegetable gum, 2 to 20 percent vegetable protein isolate, 0.05 to 0.50 percent dextrose, 0.005 to 0.05 percent food grade coloring and 5 to 20 percent flavors and seasonings and also containing a gas dispersed therein, said percents being weight percent based on the total weight of the layer composition. The improvement of the present invention comprises the novel expanded layers simulating the fat portions produced by cooking a composition mixture consisting essentially of 3 to 7 percent albumen, 25 to 40 percent water, 0 to 6 percent vegetable protein, 52 to 65 percent vegetable oil, 0.05 to 0.60 percent vegetable gums and 4 to 10 percent flavors and seasonings, wherein said composition mixture also contains a gas dispersed therein, said percents being weight percents based on the total weight of the layer composition. A further improvement comprises replacing 0 to 100% of the vegetable protein fiber contained in the lean portions with 0 to 20 percent vegetable protein concentrate.

DESCRIPTION OF THE INVENTION

The expanded layers simulating the lean portions of bacon are well known such as are described in U.S. Pat. No. 3,930,033 which is herein incorporated by reference.

The vegetable protein fibers employed are prepared by extruding vegetable proteins such as that obtained from soybeans, corn, peanuts and the like, under various extrusion conditions, through a spinerette either into an acid bath as described in U.S. Pat. No. 2,682,466 to form wet spun protein fibers or into a gaseous medium as described in U.S. Pat. No. 3,953,612 to form dry spun protein fibers. The resulting fibers can be stretched, washed to a desired pH and/or cut into desired lengths.

Vegetable proteins include vegetable protein isolate, such as soy isolate containing at least 90 weight percent protein; vegetable protein concentrate, such as soy concentrate, corn concentrate and the like containing at least 70 weight percent protein; vegetable protein flour, such as soy flour containing about 50 weight percent protein; cereal grain gluten, such as vital wheat gluten and the like.

The vegetable oils suitable in this invention include soy oil, corn oil, safflower seed oil, peanut oil and the like which are preferably not hydrogenated. The most preferred vegetable oils are soy oil and corn oil.

The vegetable gums suitable in this invention include locust bean gum, guar gum, gum tragacanth, gum karaya, gum arabic, xanthan gum, carrageenan and the like and mixtures thereof.

The red color useful for simulating lean meat is preferably obtained by a mixture of FDC Red No. 3 and FDC Yellow No. 6 food grade colors but other suitable commercially available food grade colors can also be used.

The composition also preferably contains from about 0.1 to about 0.7 weight percent caramel color. An especially useful amount is between about 0.34 and 0.5 percent.

Suitable flavors and seasonings include autolyzed yeast, hydrolyzed yeast, vegetable flavors, Maillard reactants or reaction products and other artificial flavors which combine to provide a "bacon flavor." The selection of such flavors is well known to those skilled in the food and flavor art.

The other ingredients of the composition are well known commercially available materials.

The specific mixtures suitable for the preparation of the individual simulated lean and fat portions of the improved bacon-like meat analog products are described in the above "Summary of the Invention". The preferred improved product has layers simulating the fat portion being produced by cooking a composition mixture consisting essentially of 4 to 6 percent albumen, 28 to 35 percent water, 52 to 60 percent vegetable oil, 0.2 to 0.5 percent vegetable gums and 4 to 7 percent flavors and seasonings. All of the above percents are by weight based on the total weight of the layer composition.

A further preferred improvement comprises replacing the vegetable protein fiber contained in layers simulating the lean portions with 0 to 20 percent vegetable protein concentrate, such as soy protein concentrate. Most preferably the vegetable protein fiber is replaced with about 7 to 15 percent vegetable protein concentrate.

A further improvement comprises a lean portion as described above which also contains 0 to 10 percent caseinate, preferably potassium caseinate and 0 to 10 percent gluten, preferably vital wheat gluten.

The simulated bacon product is produced by forming and by stacking alternate layers of the simulated bacon slab and then cooking the slab. This cooking step "sets" the fiber or vegetable protein concentrate, other ingredients and binder materials into a coherent mass. This cooking is carried out until the internal temperature of the simulated bacon slab is at least 75° C. Such cooking is conveniently carried out at a temperature of about 75° C. to 95° C. Any convenient heating means can be employed.

After cooking, the slab is cooled and sliced transversely to the alternate layers, by any convenient means, into slices which resemble sliced bacon strips. Any surplus slab material which results from the slicing operation can be economically saved and added in the preparation of a new lean portion in such an amount as not to alter the overall composition of the lean portion. It has been found that as much as 20 percent of the preferred lean portion can be replaced with surplus slab material without altering the lean portion composition and without adversely affecting the textural or flavor qualities of the finished product. Surprisingly the incorporation of the cooked surplus slab material improves the mouthfeel texture of the resulting product, particularly the lean portion.

Prior to the formation of the individual layers, the ingredients are mixed with an aerating type mixer so as to entrap air or other non-toxic gas within the mixture. An alternative procedure is to force air or other non-toxic gas into the mixture through a suitably designed orifice to provide extensive dispersion of fine bubbles throughout the mixture. Still a further alternative is to include in the mixture a leavening agent, such as sodium bicarbonate or commercial baking powder, which will generate gas during subsequent heating. The amount of entrapped or internally generated gas is such that during the cooking of the resulting slab, the slab expands from about 15 to about 40, preferably from about 20 to about 25, volume percent. During the cooking, the entrapped or internally generated gas expands slightly and forms numerous small bubbles which become a permanent feature of the finished product after the mixture is coagulated during heating. This enables the cooked product to develop a tender, flaky texture.

The improved fat portion of the bacon-like meat analog is prepared in the following manner. The albumen, vegetable protein and other dry ingredients, such as flavors and seasonings, are mixed with the water to hydrate the mixture. The vegetable gum is dispersed in the vegetable oil and then added to the hydrated mixture. Alternatively a portion of the vegetable oil alone may be added to the hydrated mixture first, followed by the vegetable gums dispersed in the remaining portion of the vegetable oil. The resulting mixture is then agitated to form a thick emulsion which is layered with the lean portion in the manner described above. It has been found that the high amount of vegetable oil contained in the fat portion, stabilized with vegetable gums, is important to produce the rippling or crinkling appearance when the finished product is fried and to produce the juicy and fatty mouthfeel of the fried product. In spite of the high amounts of vegetable oil and relatively low amounts of albumen compared with similar prior art products, the emulsion of this invention does not separate prior to forming a simulated slab and does not "oil-off" (cause oil separation) during the cooking of the slab.

EXAMPLE

This example illustrates the preparation of a preferred bacon-like meat analog.

A mixture of water, food grade coloring, caramel color, soy oil, flavors and seasonings was blended together. Soy concentrate (Procon 2000, available from A. E. Staley Co.; about 70% protein), albumen, soy isolate (Promine D, available from Central Soya Co., about 90% protein), dextrose, corn starch, vegetable gums (a mixture of carageenan and guar gums) were added and mixing was continued in an aerating type mixer, such as a Littleford Lodige Mixer, until the mixture was homogeneous. This resulting first mixture which is intended to be used as a simulated lean meat portion contained 6.8 percent soy protein concentrate, 10.6 percent albumen, 4.5 percent corn starch, 50.8 percent water, 14.4 percent soybean oil, 0.5 percent vegetable gums, 3.4 percent soy protein isolate, 0.5 percent caramel color, 0.1 percent dextrose, 0.015 percent color (mixture of 75 percent FDC Red No. 3 and 25 percent FDC Yellow No. 6) and 8.9 percent flavors and seasonings, said percents by weight based on the total weight of the mixture.

A second mixture was produced by first blending together water, albumen, flavors and seasonings to hydrate the dry ingredients. After hydration a portion of soy oil was added and mixed for about 5 minutes. The remaining oil containing well dispersed vegetable gum was then added. The resulting mixture was agitated in an aerating type mixer until the mixture was homogeneous. This resulting second mixture which is intended to be used as a simulated fat portion contained 5.0 percent albumen, 6.0 percent flavors and seasoning, 56 percent soy oil, 32.5 percent water and 0.5 percent vegetable gum, said percents being by weight based on the total weight of the mixture.

The above-described first and second mixtures containing entrapped air were then applied as alternate layers, one upon the other, each layer being from 0.5 to 0.75 cm thick, until a slab of about 2.5 cm thickness was obtained. This slab was then cooked by externally heating it with steam to an internal temperature of 75° to 95° C. During this heating the slab expanded about 20 to 25 volume percent. The product in the form of a solid slab was then allowed to cool to 4° C. and was then sliced transversely to the layers in slices about 0.18 cm thick, packaged and frozen.

Slices prepared as described above, when heated, as in a frying pan, have a rippled or crinkled appearance and have a resulting taste and mouthfeel which is substantially the same as cooked natural bacon.

The product of this invention is also superior to bacon in several aspects. It contains no cholesterol, it has a higher Protein Efficiency Ratio (PER) than bacon (about 3 as compared to 2.7 for lean meat) and it has a desirably high ratio of poly-unsaturated fats to saturated fatty acids.

What is claimed is:

1. In a bacon-like meat analog having alternative expanded layers simulating the lean and fat portions of bacon, wherein the expanded layers simulating the lean portions are produced by cooking a composition mixture containing 10 to 40 percent vegetable protein fiber, 5 to 20 percent albumen, 5 to 20 percent starch, 30 to 60 percent water, 3 to 40 percent vegetable oil, 0.1 to 1.5 percent vegetable gum, 2 to 20 percent vegetable protein isolate, 0.05 to 0.50 percent dextrose, 0.005 to 0.05 percent food grade coloring and 5 to 20 percent flavors and seasonings and also containing a gas dispersed therein, the improvement which comprises expanded layers simulating the fat portions produced by cooking a composition mixture consisting essentially of 3 to 7 percent albumen, 25 to 40 percent water, 0 to 6 percent vegetable protein, 52 to 65 percent vegetable oil, 0.05 to 0.60 percent vegetable gums and 4 to 10 percent flavors and seasonings, said composition mixture also containing a gas dispersed therein, said percents being weight percent based on the total weight of the layer composition.

2. The improvement of claim 1 wherein the composition mixture for the layers simulating the fat portions consists essentially of 4 to 6 percent albumen, 28 to 35 percent water, 52 to 60 percent vegetable oil, 0.20 to 0.50 percent vegetable gums and 4 to 7 percent flavors and seasonings.

3. A bacon-like meat analog according to claim 1, wherein 0 to 100 percent of the vegetable protein fiber in the composition mixture for the layers simulating the lean portions is replaced with 0 to 20 percent vegetable protein concentrate, and said composition mixture further contains 0 to 10 percent caseinate and 0 to 10 percent gluten.

4. A bacon-like meat analog according to claim 3, wherein the vegetable protein concentrate is soy concentrate.

5. A bacon-like meat analog having alternative layers simulating the lean and fat portions of bacon, in which the layers simulating the fat portions are expanded and are produced by cooking a composition mixture consisting essentially of 3 to 7 percent albumen, 25 to 40 percent water, 0 to 6 percent vegetable protein, 52 to 65 percent vegetable oil, 0.05 to 0.60 percent vegetable gums and 4 to 10 percent flavors and seasonings, said composition mixture also containing a gas dispersed therein, said percents being weight percent based on the total weight of the layer composition.

6. A bacon-like meat analog according to claim 5 wherein said composition mixture consists essentially of 4 to 6 percent albumen, 28 to 35 percent water, 52 to 60 percent vegetable oil, 0.20 to 0.50 percent vegetable gums and 4 to 7 percent flavors and seasonings.

* * * * *